Patented Sept. 17, 1935

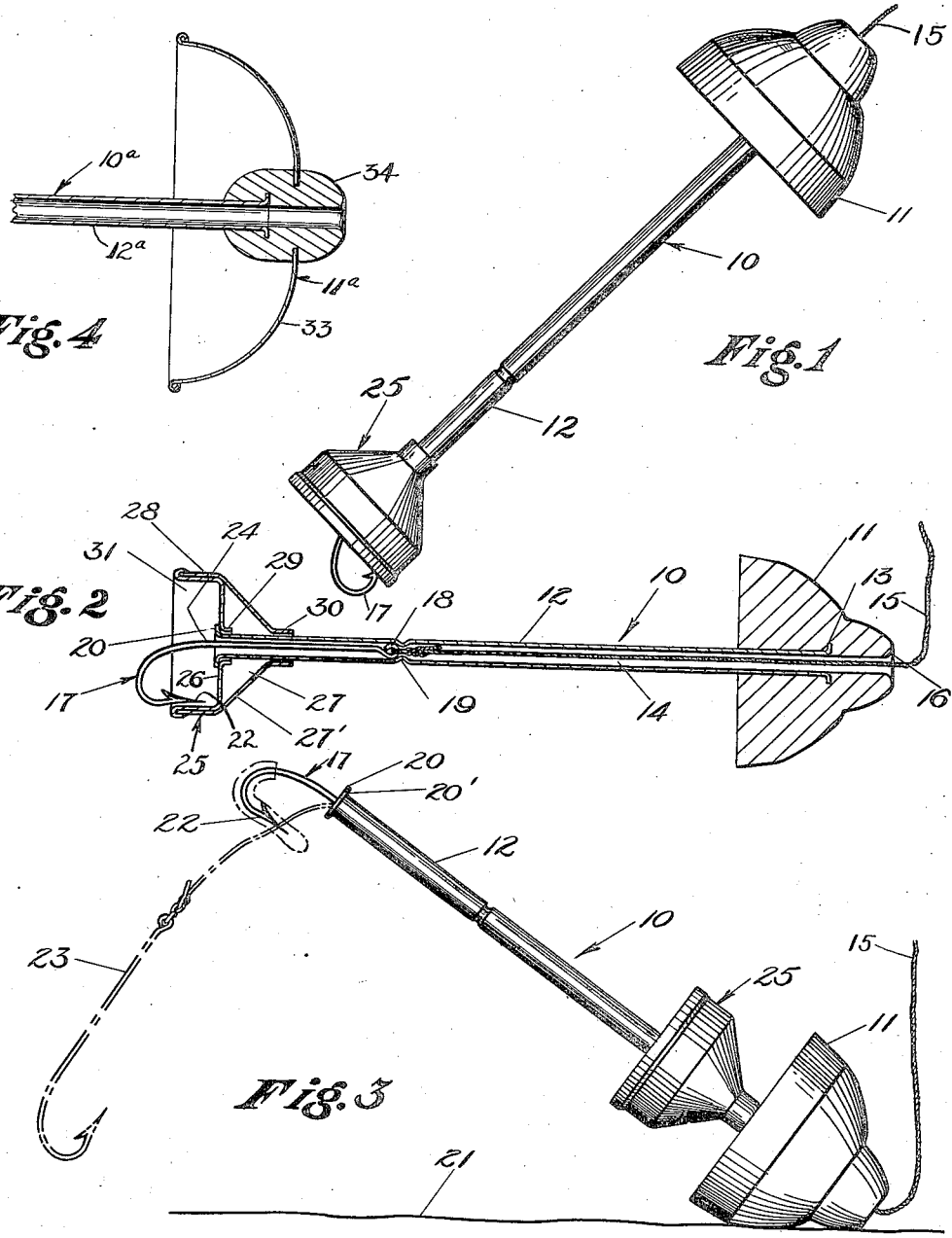

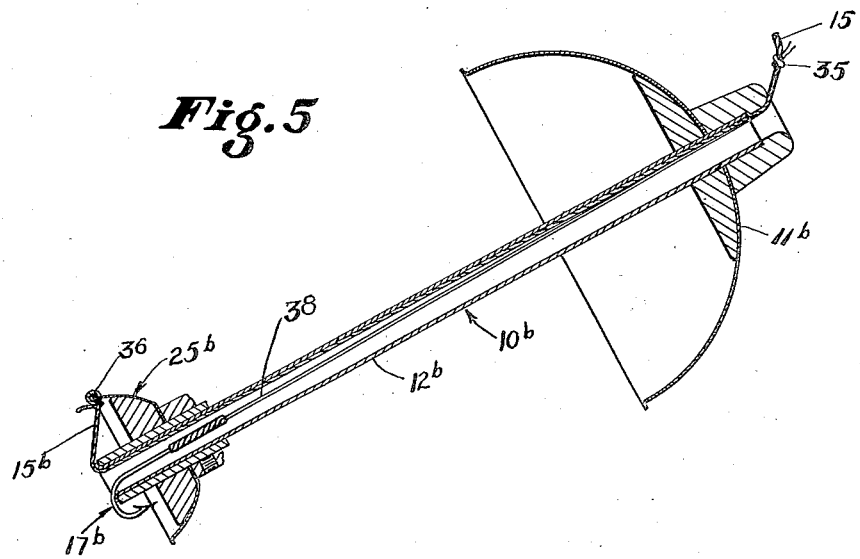
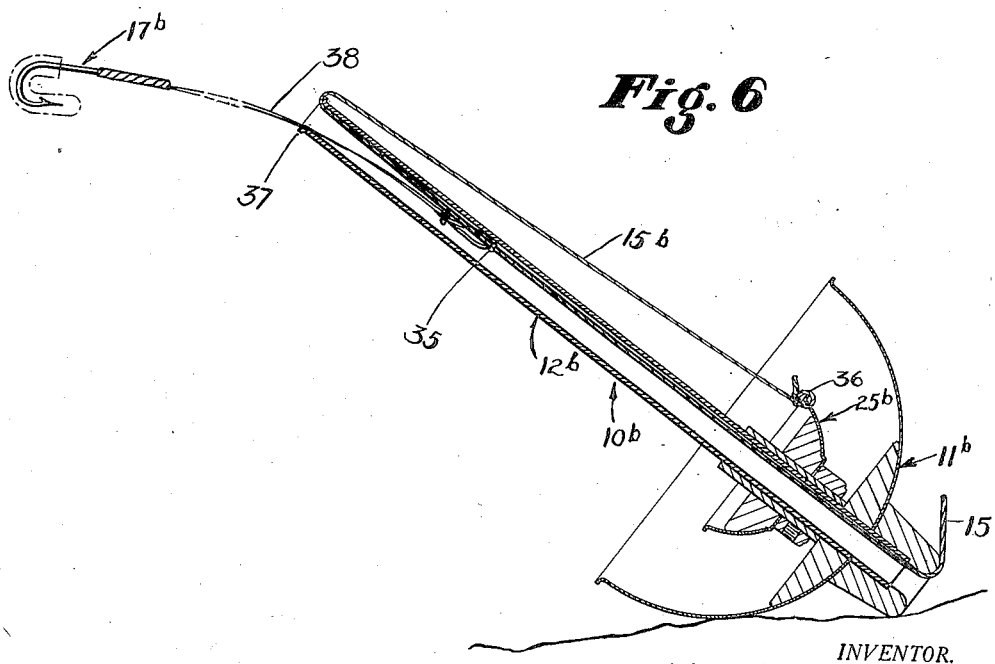

2,014,517

UNITED STATES PATENT OFFICE 2,014,517

FISHING DEVICE

Alex Beregow, Norwalk, Conn.

Application November 5, 1934, Serial No. 751,538

15 Claims. (Cl. 43—39)

This invention relates to improvements in fishing devices.

It is an object of the present invention to provide a fishing device which will effectively protect the barbed end of a fishing hook from catching into weeds, stones, tree stumps and other snags while being pulled through and out of the water.

Features of the present invention related to the aforesaid object include a novel guard adapted to be automatically moved to a position remote from the hook as the fishing device is dropped into the water and when it reaches a position of rest so that there will be no interference tending to prevent the fish from taking the barbed hook.

A further feature in connection with this object includes a hook guard which automatically moves into the hook protecting position when the fisherman begins to pull the fishing device from its normal position of rest at the bottom of the body of water.

It is another object of the present invention to provide a fishing device which will automatically space the barbed hook a predetermined distance from the bottom of the body of water in order to facilitate a fish striking at the bait and in order to enhance the possibilities of getting a strike, since it is well known that with some fish it is desirable to drop the bait to the bottom and then lift it and maintain it a very short distance from the bottom.

Features in connection with this second object include the provision of a novel cooperating weight and tube. The weight facilitates casting the fish hook to a desired location and is so shaped that a fish can move the entire device circularly about in the water without much effort, viz., the weight rolls about on the bottom.

It is a still further object of the present invention to provide a fishing device adapted normally to hold the baited hook in spaced relation to the main supporting parts of the fishing device but which will still enable a fish to take the baited hook away from the main support thereof without carrying or moving the main supporting device.

Features in connection with this last named object include a tubular support adapted to accommodate and support the baited hook and adapted to form a free guide for the regular fishing line. A complementary feature includes the provision of a novel stop adapted to prevent the loss of the main supporting parts of the fishing device, even though the hook is broken in half as occurs quite often while fishing.

Yet another object of the present invention is to provide a weighted fishing device which will sink slowly through the water so that a hook and tube thereon will not be driven into the lake bottom.

One of the very important features of the present invention is the provision of means adapted to thoroughly protect the hook while moving the device through the water and automatically moving the baited hook from a somewhat rigid position close to the device to a flexible position away from the device when it reaches a position of rest on the lake bottom.

Other objects, features, and advantages will appear hereinafter.

In the drawings:

Figure 1 is a view of the fishing device of the present invention with the parts in the position they assume while the device is being drawn upwardly through the water.

Fig. 2 is a sectional view through the center of the device.

Fig. 3 is a view of the device in its lowered and operative position.

Fig. 4 is a fragmentary detail of a modified form of the main support and weight.

Figs. 5 and 6 are longitudinal sectional views of the preferred form of the invention in two operating positions.

The present invention is not limited to the details of construction and exact arrangement of parts illustrated in the accompanying drawings and described in the accompanying specification, for it is capable of other embodiments, and the phraseology employed is for the purpose of description and not of limitation.

Referring now in detail to the drawings, the present invention comprises a main support 10 including a weight 11, made of lead or other heavy material, supporting a tube 12 of a predetermined length. Preferably the tube 12 is moulded into weight 11, with a flange 13 embedded therein as may best be seen in Fig. 2. However, the tube may extend all the way through the weight, if preferred for manufacturing economy, and may be held to the weight by the lead itself or through any other suitable means. A bore 14 in the tube with a co-extensive section extending through the weight 11 permits free passage of a line or leader 15 therethrough. Preferably the weight is rounded as at 16 to permit free and unimpeded passage of the line.

Any preferred and usual type of hook 17 may, through its eye 18, be secured to the leader or line 15. Now, it should be particularly noted that the tube 12 is provided with a stop 19 preferably in the form of an integral spun-in flange adapted to limit the extent of travel of the hook 17 into the tube 12 so that the barb 22 and normally baited end of the hook is held in spaced relation to the main support 10. Thus, the outer end of the tube will not interfere in any manner with the fish striking at the baited hook. Further, and of particular importance, this stop prevents loss of the main support should the hook be broken in half since the eye section of the hook will still engage the stop 19 shown in Fig. 2 and thereby lift the main support 10 from the water when this is being effected as shown in Fig. 1.

The weight 11 is preferably made in a substantially conical shape, as shown, so that it effectively positions the outer end 20 of the tube 12 a predetermined distance from the bottom 21 of the lake or other body of water, as is shown best in Fig. 3. This is a special advantage when fishing for certain types of fish which naturally range close to the lake bottom, or when fishing for other types of fish which seek the lower levels during warm days or at predetermined times of the day.

It represents another definite advantage because the fish can make a quick, clean strike at the bait when it is positioned from the lake bottom, and is therefore more apt to be hooked than when the fish must pick the baited hook from the lake bottom before attempting to swallow the bait. Further, it tends to make the fish take the bait at the barb 22 end of the hook, rather than taking the bait at its opposite end where the hook is not barbed.

Although the structure just described supports the baited hook 17 a predetermined extent from the lake bottom and forms an effective support, it allows the fish to take the baited hook and line and swim, with comparative freedom, through the water away from the device as is roughly indicated by dot-and-dash lines 23 in Fig. 3. The shank 24 of the hook and the attached line or leader 15 may be drawn freely through the tube 12. Thus, the fish need not carry the main support 10 in any manner when swimming through the water with the baited hook, and the fisherman need not lift the entire main support for it is merely necessary for him to give the line 15 a short quick pull through the tube 12 in order to hook the barb 22 end of the hook into the fish's mouth and thereafter lift the entire device from the water.

In passing too, it may be noted that if the fish moves the baited hook 17 in a direction other than out of the tube 12 at the start, viz., before making a run, the conical shape of the weight 11 permits the fish to move the outer end 20 of the device in an arcuate path with comparative freedom.

A very efficient guard 25 is also provided by the present invention to prevent the barb 22 on the hook 17 from catching weeds, stones, and other snags when being drawn through the water or moved about outside of the water. Preferably this guard comprises a pair of sleeves 26 and 27 pressed together at 28 and preferably having integral sleeve-like bearings 29 and 30 adapted to slide freely upon the tube 12 from an inoperative position near the weight 11 as shown in Fig. 3 into an operative position at the opposite end of the tube 12 as shown in Fig. 1.

A flange 20' on the outer end of the tube keeps the guard 25 on the main support 10 and limits movement of the guide into the operative position. These retaining and stopping characteristics are clearly shown in Fig. 2.

When the fishing device of the present invention is dropped in the water, the weight 11 sinks to the lake bottom 21, as shown in Fig. 3, whereupon the guard 25 through the sleeves 29 and 30 slides down the tube 12 into the inoperative position thereby lifting the exposed and baited end of the hook 17 in a convenient position for a fish to strike and take it. However, when the fisherman takes up the fishing device for the purpose of casting it or moving it through the water to a new location, the weight is raised higher than the rest of the device in the water, as shown in Fig. 1, whereupon the guard 25 slides down the tube into the operative position with the cup 31 enveloping the barb so that it cannot catch into snags of any kind. The sleeve 27 is preferably provided with a tapered section 27' adapted to brush aside weeds, grass, branches, and other snags as the device is being drawn through the water or to ride over stones and the like in such manner as to prevent the hook from catching.

The guard 25 may be made of one-piece bakelite instead of formed of metal, as shown, or may be otherwise made and shaped. Other variations and modifications may be made within the scope of the present invention, and portions of the improvements may be used without others.

In Fig. 4 there is shown a modified form of main support 10a wherein a special form of weight 11a is provided. The weight instead of being made as a solid member as shown in Figs. 1, 2 and 3 is provided with a cupped shell 33 held relative to a tube 12a by means of a moulded weight 34 of lead or the like. These three members may be variously held together but the preferred arrangement at the present time is as shown in Fig. 4.

The purpose of the inverted cup 33 is to present a larger area of the device to the water as it sinks downwardly and particularly through its cup shape to collect water or to build up a resistance to a straight heavy drop so that it will sink slowly into the water and thereby prevent the hook 17 and tube 12 from imbedding themselves in the lake bottom as might occur when the device sinks in a fast, unimpeded manner. The remainder of the device shown in Fig. 4 is intended to include the hook 17, line 15, and guard 25 as shown in Figs. 1 through 3.

A particularly novel and advantageous form of the invention is shown in Figs. 5 and 6 and comprises a main support 10b with a weight 11b, the latter being substantially the same as the weight 11a just described so far as operating principle is concerned but merely built up slightly differently. The particularly novel feature of this form of the invention includes a weighted guard 25b having a cord connection 15b with the main line 15 and snell hook 17b.

The hook 17b may be connected to the main line with a knot 35 and the main line may be extended to the guard 25b where it is connected through a suitable aperture as by a knot 36. Thus, when the main support 10b is dropped into the water, the hook is pulled against the end of a tube 12b and at the same time the cord 15b pulls the guard 25b down into engagement with the flange 37 on the end of the tube as is clearly shown in Fig. 5, thereby protecting the hook from undesirable objects.

However, when the main support reaches the bottom of the body of water the weight 11b is supported at an angle as shown in Fig. 6 whereupon the weighted guard 25b slides down the tube to the weight 11b and through the line connection 15b and knot 35 moves the hook 17b outwardly of the tube 12b and free of the main support 10b.

There may be a regular line connection between the hook 17b and the knot 35 so that the baited hook will sink toward the bottom of the body of water as it is automatically ejected from the tube 12b. However, it is preferably, and as shown, in the form of a snell connection 38 so that the baited hook is supported in a flexible manner in spaced relation relative to the main support 10b and relative to the lake bottom as shown in Fig. 6, thereby making it easier for the fish to seize the bait and to initially start its swim with the bait away from the device. This "get away" is further promoted by the slack between the knot 35 and the flange end 37 of the tube 12b, and the fact that the fish need pull only the light weight guard 25b up the tube 12b before moving the large weight 11b.

With this form of the invention the device need not be lost even though the hook 17b or the snell 38 is broken, because the line 15 through its connection to the guard 25b and the latter pulling against the flange 37 keeps the fishing device 10 connected to the fisherman's rod or to the main line 15.

The advantageous features of saving the device even though the hook is broken and of automatically ejecting the bait from the device at a predetermined time viz., at the lake bottom when the device is brought to rest, may be used equally well with the solid weight 11 illustrated in Figs. 1 through 3. Reference to lake bottom is intended to cover the bottom of any body of water.

Other variations and modifications may be made within the scope of the present invention and portions of the improvements may be used without others.

Having thus described the invention, what is claimed as new and for which it is desired to obtain Letters Patent, is:

1. In a fishing device the combination of a weight; a tube carried by the weight; a hook and line; and a stop in the tube adapted to permit passage of the hook carrying line outwardly relative to the tube and to stop travel of the line and hook inwardly thereof.

2. In a fishing device the combination of a tube adapted to locate, support, and guide a hook and line; and a conical shaped weight at one end of said tube adapted to locate and support the tube, and the hook associated therewith, in spaced relation to the bottom of a body of water.

3. In a fishing device the combination of a weight having a bore; a tube carried by said weight having a bore co-extensive with the bore in the weight adapted to receive a hook and line; and a guard slidable on said tube into an inoperative position near the weight and into an operative position near the outer end of the tube in order to prevent the hook from catching into snags.

4. In a fishing device the combination of a weight having a bore; a tube carried by said weight having a bore co-extensive with the bore in the weight adapted to receive a hook and line; a guard slidable on said tube into an inoperative position near the weight and into an operative position near the outer end of the tube in order to prevent the hook from catching into snags; and means on said tube for limiting movement of the guard into the operative position.

5. In a fishing device the combination of a main support adapted to receive a hook and line; and a guard on said device, movable into operative and inoperative hook protecting positions thereon.

6. In a fishing device the combination of a main support adapted to receive a hook and line; and a guard on said device automatically movable into operative and inoperative hook protecting positions thereon.

7. In a fishing device the combination of a weight having a bore; a tube carried by said weight having a bore co-extensive with the bore in the weight adapted to receive a hook and line, and to support the hook free from the bottom of a body of water, said device permitting the fish to carry the hook and line without moving the weight and permitting the fisherman to hook the fish without lifting the weight.

8. In a fishing device the combination of a conical shaped weight; a tube carried by said weight, said tube and weight accommodating a line and hook; and a conical shaped guard carried by said tube adapted to prevent the hook from catching into snags.

9. In a fishing device the combination of a weight; a tube carried by said weight, said tube and weight accommodating a line and hook; a guard carried by said tube adapted to prevent the hook from catching into snags; and a cup section in said guard adapted to envelope the hook.

10. In a fishing device the combination of a weight; a tube carried by the weight adapted to fully receive and pass a line and to partially receive a fishing hook; and a cupped member in said weight adapted to impede travel of said device down into a body of water.

11. In a fishing device the combination of a weight; a tube carried by the weight adapted to fully receive and pass a line carrying a fishing hook; and a member associated with said weight adapted to impede travel of said device down into a body of water.

12. In a fishing device the combination of a weight; a tube carried by the weight adapted to fully receive and pass a line and to partially receive a fishing hook; and a member associated with said weight adapted to impede travel of said device down into a body of water and slidable down said tube toward the weight to assist in moving the tube away from the bottom of the body of water.

13. In a fishing device the combination of a main support; a hook; a guard; and a connection between said guard and hook adapted to protect said hook while the device is being moved through the water and to automatically eject the hook from the device when it comes to rest in the water.

14. In a fishing device the combination of a main support; a hook; a main line; and means for automatically ejecting said hook from the main support when the main line is not taut.

15. In a fishing device the combination of a main support; a slidable protective member on the main support; a hook; a main line; and means for coordinately moving said hook and protective member to a protective position when the line is drawn taut, and for automatically ejecting the hook when the main line is no longer taut.

ALEX BEREGOW.